US012565281B2

(12) United States Patent
Torre

(10) Patent No.: US 12,565,281 B2
(45) Date of Patent: Mar. 3, 2026

(54) FOLDABLE BICYCLE STRUCTURE

(71) Applicant: Valerio Torre, Palermo (IT)

(72) Inventor: Valerio Torre, Palermo (IT)

( * ) Notice: Subject to any disclaimer, the term of this patent is extended or adjusted under 35 U.S.C. 154(b) by 729 days.

(21) Appl. No.: 17/790,173

(22) PCT Filed: Dec. 31, 2020

(86) PCT No.: PCT/IB2020/062575
§ 371 (c)(1),
(2) Date: Jun. 30, 2022

(87) PCT Pub. No.: WO2021/137184
PCT Pub. Date: Jul. 8, 2021

(65) Prior Publication Data
US 2022/0355888 A1      Nov. 10, 2022

(30) Foreign Application Priority Data

Dec. 31, 2019      (IT) ........................ 102019000025813

(51) Int. Cl.
| | |
|---|---|
| *B62K 15/00* | (2006.01) |
| *B62J 43/13* | (2020.01) |
| *B62J 43/28* | (2020.01) |
| *B62J 50/10* | (2020.01) |
| *B62M 6/55* | (2010.01) |

(52) U.S. Cl.
CPC ............. *B62K 15/006* (2013.01); *B62J 43/13* (2020.02); *B62J 43/28* (2020.02); *B62M 6/55* (2013.01); *B62J 50/10* (2020.02)

(58) Field of Classification Search
CPC ......... B62K 15/006; B62J 43/28; B62J 43/13; B62J 50/10; B62M 6/55; B60L 53/80; B60L 50/66
USPC ......................................... 180/206.1; 310/60
See application file for complete search history.

(56) References Cited

U.S. PATENT DOCUMENTS

| | | | | |
|---|---|---|---|---|
| 5,586,652 A | * | 12/1996 | Smilanick .............. | B62K 15/00 |
| | | | | 190/117 |
| 10,381,616 B2 | * | 8/2019 | Hsia ......................... | B62M 6/90 |
| 2013/0057182 A1 | * | 3/2013 | Juan ........................ | B60L 50/52 |
| | | | | 310/68 R |

(Continued)

FOREIGN PATENT DOCUMENTS

| | | | | | |
|---|---|---|---|---|---|
| KR | 20110021278 A | * | 3/2011 | ................ | B62J 1/28 |
| WO | WO-2019161482 A1 | * | 8/2019 | ................ | B62J 1/08 |

*Primary Examiner* — Valentin Neacsu
*Assistant Examiner* — Morgan Knauf
(74) *Attorney, Agent, or Firm* — Rivka Friedman

(57) ABSTRACT

A foldable bicycle structure comprises a supporting frame (2) having a rear wheel (3) and a front wheel (4), a handlebar (5) fastened to the frame (2) and a seat post (6). The supporting frame (2) is divided into a front portion (9) and a rear portion (10) adapted to be connected to respective wheels (3, 4) and reciprocally hinged around a first hinge axis (11) to switch between an extended use configuration to a compact configuration. The supporting frame (2) is also provided with one or more straps (14, 15) each having one end fixed to the supporting frame (2) and one free end provided with a hook to allow the respective strap to be unwound (14, 15) and its hooking to another part of the structure and be used as a shoulder strap for transporting the structure in a compact configuration.

12 Claims, 8 Drawing Sheets

(56)                    References Cited

U.S. PATENT DOCUMENTS

| | | | |
|---|---|---|---|
| 2016/0031525 A1* | 2/2016 | Craven | .................. B62K 25/02 |
| | | | 180/206.7 |
| 2019/0135368 A1* | 5/2019 | Vermeulen | ............... B62M 6/40 |
| 2019/0202520 A1* | 7/2019 | Yap | ..................... B62K 15/006 |

* cited by examiner

FOLDABLE BICYCLE STRUCTURE

TECHNICAL FIELD

The present invention is generally applicable to the technical field of transport means on wheels and particularly relates to a structure of a bicycle that can be folded and is adapted to be transported by a user.

STATE OF THE ART

As known, one of the drawbacks of common bicycles is the difficulty in transporting them on shorter or longer journeys that require the use of other vehicles, such as cars, trains and planes.

As matter of fact, their particular configuration makes them uncomfortable and particularly bulky to carry, in such a measure that if it were necessary to load a bicycle as baggage in the hold of an airplane, it would normally be classified as extraordinary baggage and therefore subject to an additional fee.

Various solutions are known that allow to reduce the overall dimensions of a bicycle to facilitate the transport thereof when it is not necessary to use it.

However, the known solutions are not optimized to make transport simple and convenient even in particular conditions such as travel by plane or train and always require the manual transport of the vehicle in its closed configuration, with evident limitation of movements for the user who will find himself always with one or both hands occupied.

SCOPE OF THE INVENTION

An object of the invention is to overcome the above drawbacks, providing a foldable bicycle structure characterized by high efficiency and relatively cost effectiveness.

A particular object is to provide a foldable bicycle structure which can be easily moved from an open configuration of use typical for this kind of vehicle to a folded configuration wherein it is easy and convenient to transport and has relatively small overall dimensions.

A particular object is to provide a foldable bicycle structure which in the folded configuration may have maximum dimensions sized to fall within the limits set by the airlines for its loading as standard baggage or also as hand baggage.

Still another object of the present invention is to provide a foldable bicycle structure that may be comfortably carried on the shoulder by the user in the folded configuration.

Still another object of the present invention is that of realizing a foldable bicycle structure that may be implemented with the common means to be used as an electric bicycle, including one or more supply batteries and that still maintains the safety requirements to be classified as hand luggage.

These purposes, as well as others that will become more apparent hereinafter, are achieved by a foldable bicycle structure which, according to claim 1, comprises a load-bearing frame having a rear wheel and a front wheel, a handlebar attached to said frame, a steerer seat post having a lower end removably anchored to said frame and an upper end associated with a saddle.

The load-bearing frame is divided into at least one front portion and at least one rear portion provided with respective wheels and reciprocally hinged to move between an extended configuration of use to a compact configuration wherein said wheels are substantially parallel to each other, said frame being provided with one or more straps each having one end fixed to said frame and one free end provided with a hook to allow the straps to be unwind and hooked to another part of the structure and to be used as a strap for transporting the structure in a compact configuration.

This combination of features will allow the structure to be closed in a particularly compact configuration to be carried easily through the one or more straps that will wrap around the user's shoulders or bust.

Advantageous embodiments of the structure are obtained in accordance with the dependent claims.

BRIEF DISCLOSURE OF THE DRAWINGS

Further features and advantages of the structure according to the invention will become more evident in the light of the detailed description of some preferred but not exclusive embodiments of the structure, illustrated by way of non-limiting example with the aid of the accompanying drawing tables in which.

BEST MODE OF CARRYING OUT THE INVENTION

Figure 1:
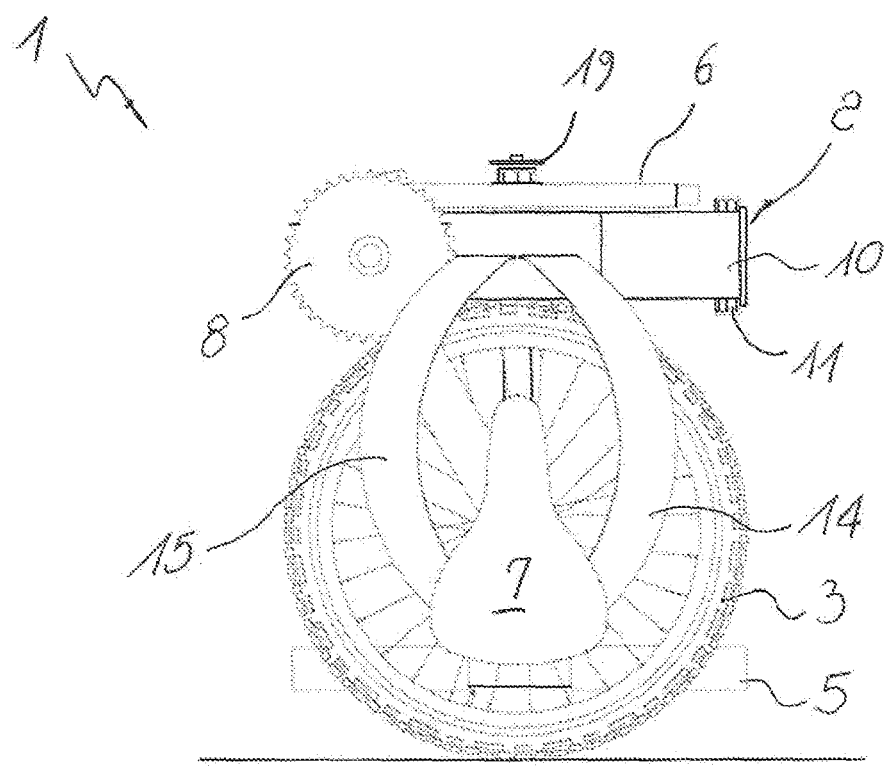
FIG. 1 is a front view of the foldable bicycle structure according to the invention in a first preferred configuration in the compact configuration.

With reference to the attached figures, some typical configurations of a foldable bicycle structure according to the invention designed to be used to define a common bicycle are schematically illustrated.

The bicycle structure may be designed to make bicycles of any type and size, without particular limitations.

In its most general configuration, the bicycle structure, indicated globally with 1, comprises, in its basic form, a supporting frame 2 having a rear wheel 3 and a front wheel 4, a handlebar 5 attached to the frame 2 and a seat post 6 having a lower end removably anchored to the frame 2 and an upper end associated with a saddle 7.

The structure 1 may also already be implemented with a central movement 8, typically provided with a front crown and a rear crown or pinion and configured according to any of the typical modalities for this kind of element, without particular limitations.

According to a peculiar feature of the invention, the supporting frame 2 is divided into at least one front portion 9 and at least one rear portion 10 adapted to be constrained to respective wheels 3, 4, for example by means of the typical fork structures, not shown.

The two frame portions 9, 10 are reciprocally hinged around a first vertical hinge axis 11 to move between an extended configuration of use to a compact configuration, illustrated in the figures, in which the wheels 3, 4 are mutually side by side and substantially parallel to each other, i.e. they have their respective planes orthogonal to the respective hubs 12, 13 parallel to each other.

In particular, in a preferred but non-limiting manner, in the compact configuration the two wheels 3, 4 will have their respective hubs 12, 13 arranged in a mutually coaxial position.

Furthermore, the frame 2 will be provided with one or more straps 14, 15 each having a fixed end to the frame 2 and a free end provided with a hook, not visible from the figures, suitable for allowing the respective strap 14, 15 to unwind and its coupling to another part of the structure 1.

In this way, the straps 14, 15 may be used as shoulder straps to be wrapped around the user's shoulders so as to facilitate the transport of the structure in the compact configuration.

Figure 3:
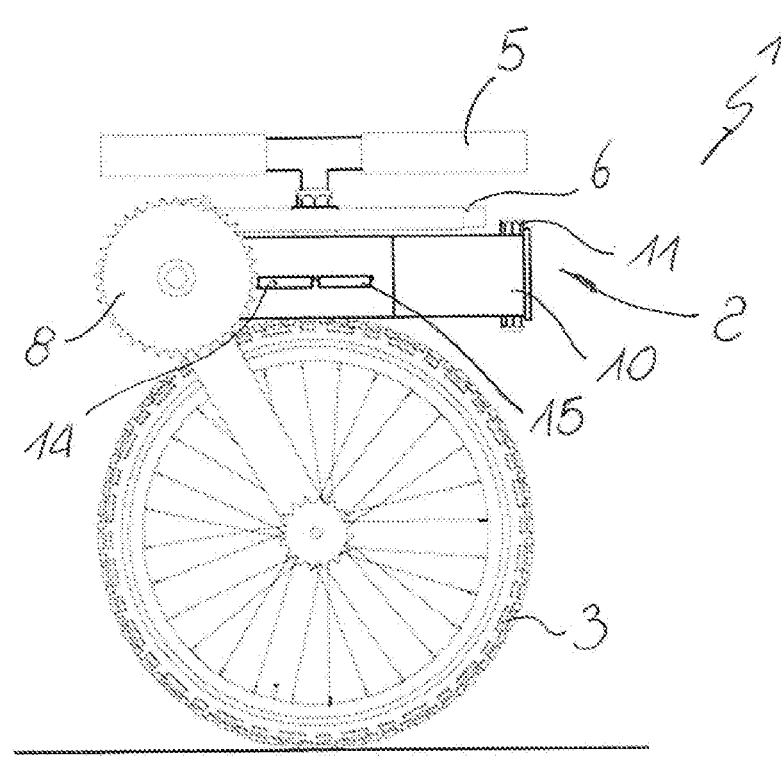
FIG. 3 is a front view of the foldable bicycle structure according to the invention in a second preferred configuration in the compact configuration.

According to a particularly advantageous configuration, common to the variants illustrated in FIGS. 1 and 3, at least one of the portions 9, 10 of the frame 2, preferably both, will be hollow, so that one or both of the straps 14, 15 may be housed thereinside.

The latter will be rolled up and housed in one of the hollow portions, for example the rear portion 10, and will be extractable through a suitable slot 16 present in the same hollow portion 10 to allow them to unwind and to subsequently hook the respective free ends to another part of the structure.

According to the preferred configuration of the same figures, the free ends of the straps 14, 15 may be hooked to the underseat by means of a suitable hooking element, not visible from the figures.

In this case, the seat post 6 will be completely removable from the frame 2 while the saddle 7 will be removable from the seat post 6 to be anchored, by means of suitable coupling means, not shown and having a variable configuration according to the type of saddle, to the hub 12 of one of the wheels 3 in a position substantially parallel to the plane of the wheels themselves.

Furthermore, one of the portions 9, 10 of the frame 2 will also comprise a seat 17 for positioning and holding the seat post 6 in the removed condition and in which the post 6 will be adapted to be arranged substantially parallel to the same portion of the frame 2, thus not to contribute to the overall dimensions of the structure 1 in the compact configuration.

Figure 5:
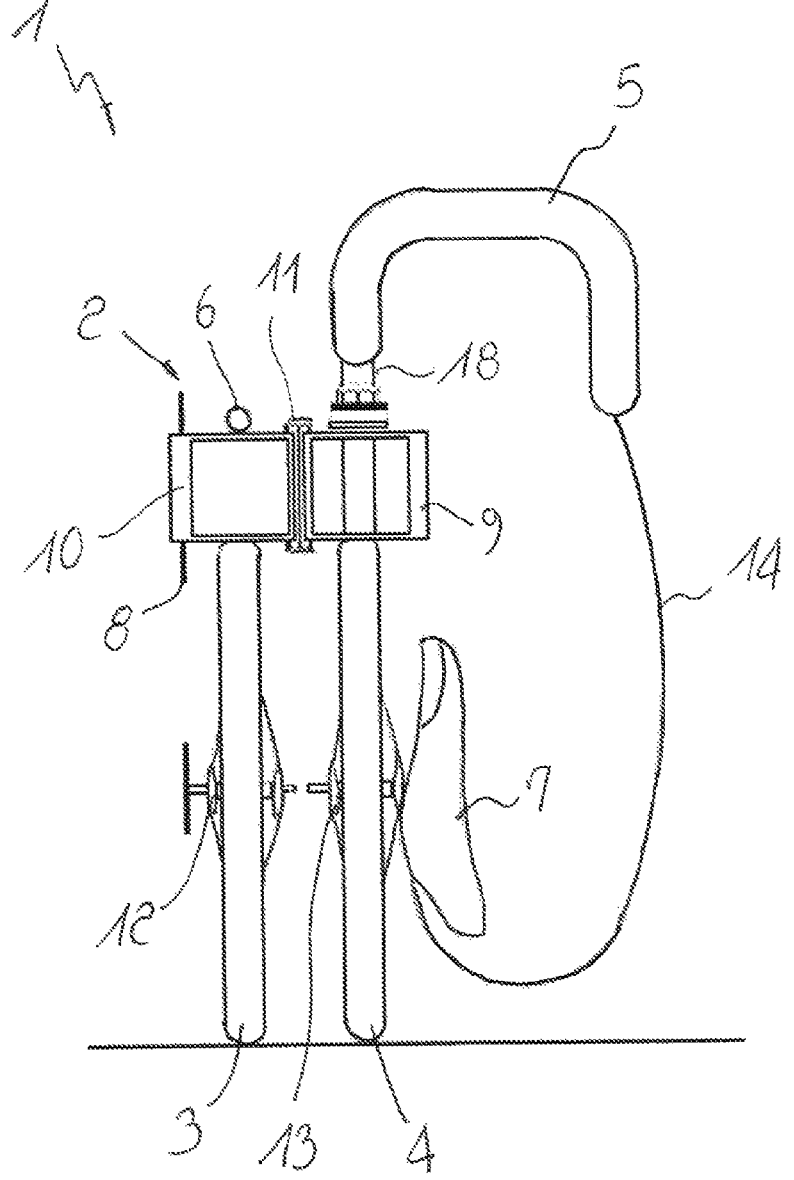
FIG. 5 is a front view of the foldable bicycle structure according to the invention in a third preferred configuration in the compact configuration.

FIG. 5 shows a third configuration of the structure 1 wherein the straps 14, 15 are always arranged externally to the frame 2 and have both ends which can be released and hooked to respective parts of the structure, such as the handlebar 5 and the saddle 7, depending on the needs.

According to a particularly preferred configuration, the structure 1 in the compact configuration will have maximum dimensions between 60×50×30 and 50×30×10 to be classified as standard luggage when it is necessary to transport the structure 1 as luggage in vehicles such as trains, airplanes and ships.

Even more preferably, the maximum size of the structure 1 in the compact configuration will not exceed the thresholds of 55×40×20 cm to allow it to be classified as hand luggage should it be necessary to board it on an airplane.

Preferably, the weight of the structure 1, possibly net of the pedals and others accessories and any batteries, not exceeding 10 Kg, so as to be suitable to be checked in as hand luggage in the cabin.

To further simplify the transport, the structure 1 may also comprise a covering element, not illustrated, suitable for covering the structure 1 when the frame 2 is in the compact configuration and possibly also when it is in the extended configuration. The cover element will also have the function of protecting against external agents and may also be provided with one or more external pockets designed to hold objects of any type, so as to transform the structure into a real travel backpack.

In addition or alternative to the cover element, it will be possible to provide a bag, for example in plastic, provided with one or more compartments for accessories.

The methods for connecting the various parts of the structure 1 to the supporting frame 2 may vary according to requirements.

Figure 2:
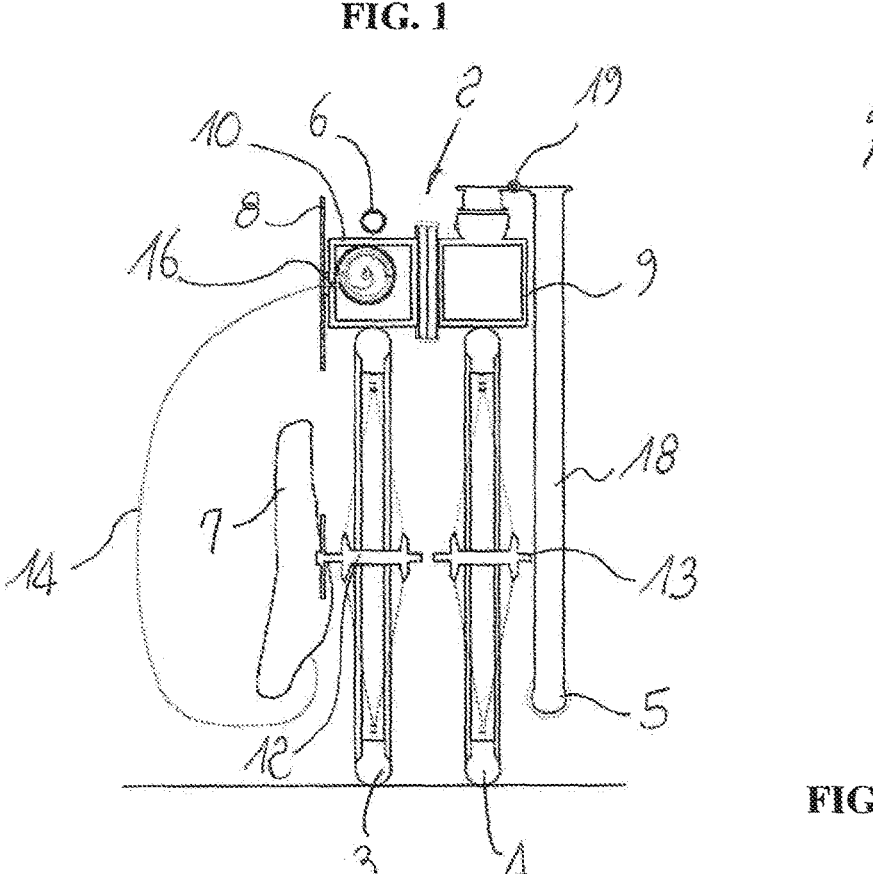
FIG. 2 is a sectional side view of the structure of FIG. 1.

FIG. 1 shows a first configuration in which the handlebar 5 comprises a stem 18 hinged to the front portion 9 of the frame 2 to pass from a typical raised position of use to a lowered position when the supporting frame 2 is in the compact configuration, by means of a rotation around a second horizontal hinge axis 19, as visible in FIG. 2, so as to always remain integral with the frame.

In the lowered position, the stem 18 of the handlebar 5 will be arranged parallel to the plane of the wheels 3, 4.

In FIG. 3 a second configuration is shown in which the handlebar 5 comprises a tubular stem 18 having a telescopic structure to pass from an extended position of use to a lowered and compact position when the supporting frame 2 is in the compact configuration.

Figure 4:
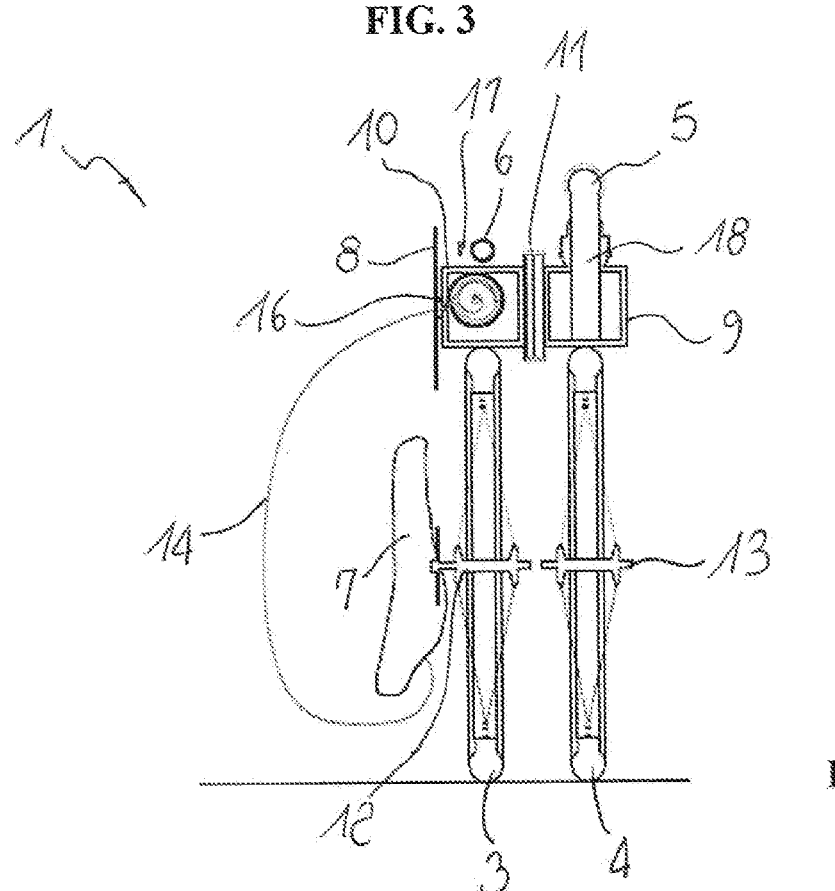
FIG. 4 is a sectional side view of the structure of FIG. 2.

As can be seen from FIG. 4, in the lowered and compact position, the stem 18 of the handlebar 5 will be almost completely inserted into the hollow front portion 9 of the frame 2.

FIG. 5 shown a further variant which differs from the previous one essentially in the shape of the handlebar 5, as well as in the configuration of the straps 14, 15 as previously described.

In particular, the handlebar 5 will have an arched shape to define, in the compact structure configuration, a support for the user's back such as to give the structure in the compact configuration high ergonomics.

Figure 6:
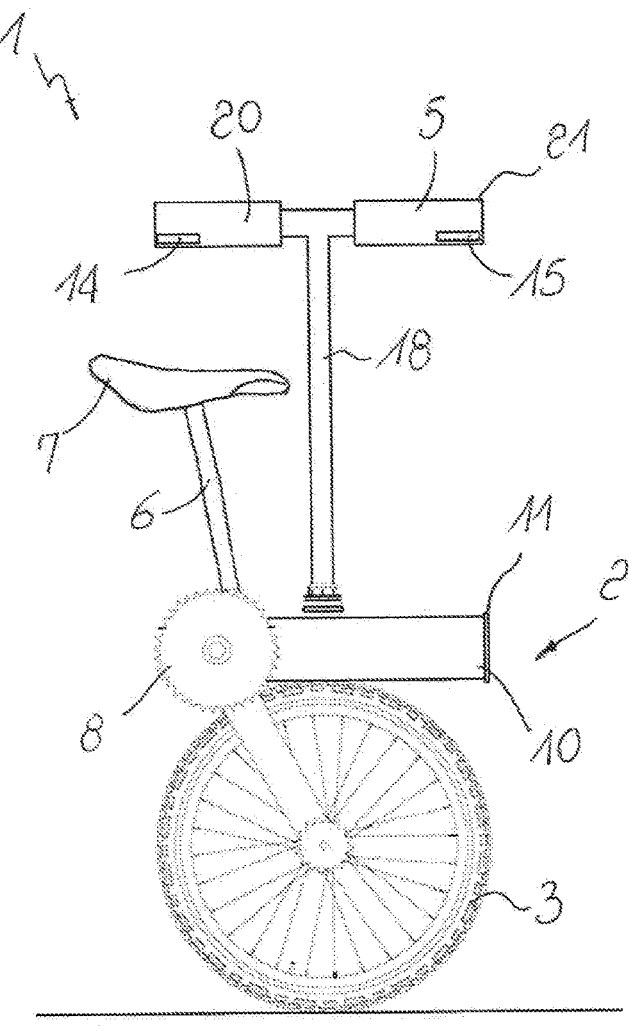
FIG. 6 is a front view of the foldable bicycle structure according to the invention in a fourth preferred configuration in the compact configuration.
Figure 7:
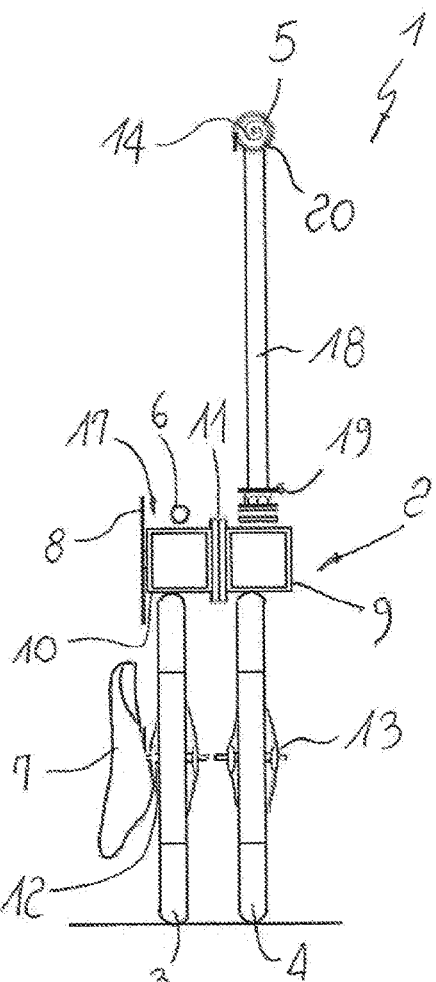
FIG. 7 is a sectional side view of the structure of FIG. 6.

FIG. 6 illustrates a further configuration which differs from the previous ones in that the straps 14, 15 are rolled up inside the handlebar 5 and in particular in correspondence with respective handles 20, 21 to come out through respective slots and be thus carried out to hook to a further part of the structure 1.

According to a further configuration, not shown in its entirety, the structure 1 will comprise a central movement associated with an electric motor provided with battery-rechargeable power supply means.

Figure 8:
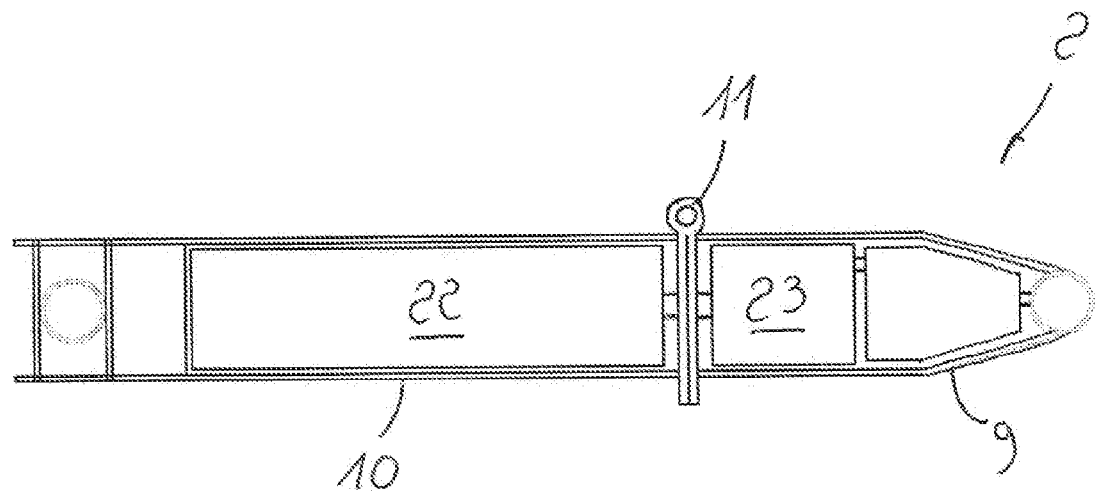
FIG. 8 is a sectional side view of a detail of a structure according to a fifth configuration in the extended configuration.
Figure 9:
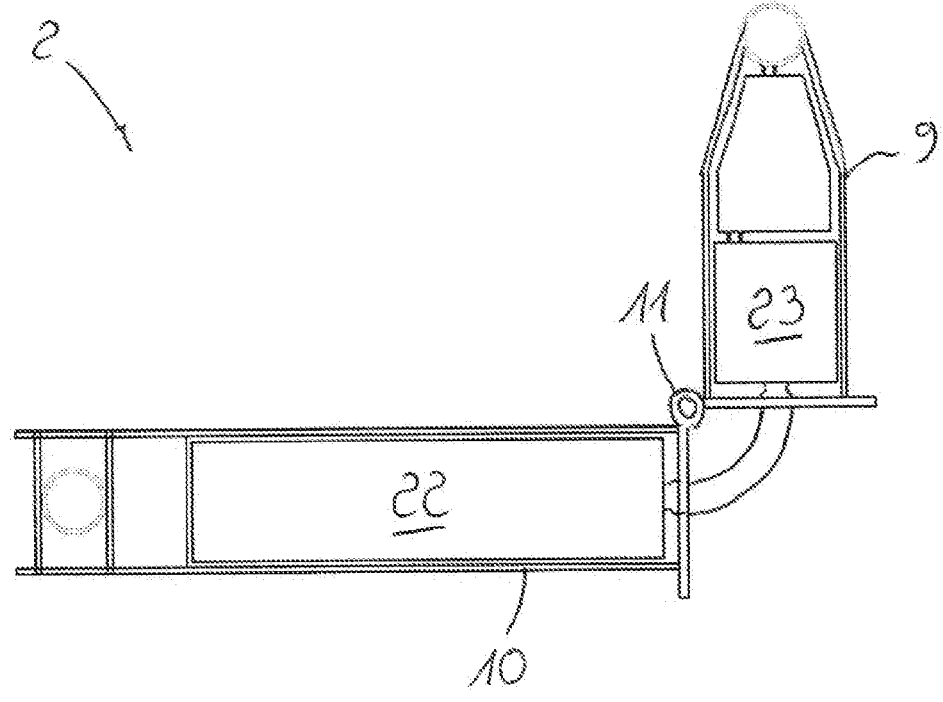
FIG. 9 is a sectional side view of the detail of FIG. 8 in the compact configuration.

Advantageously, the power supply means may comprise two or more rechargeable batteries 22, 23 housed in respective hollow portions 9, 10 of the frame 2, as visible in FIGS. 8 and 9.

Furthermore, at least one of the batteries 22, 23, or both, will be housed in the respective hollow portion 9 of the frame 2 in an extractable manner, so that it can be removed if necessary, for example before a possible loading in the hold or cabin of an aircraft in order not to exceed the limits of weigh imposed by law.

According to a preferred configuration, there may be three lithium batteries 22 separated from each other and each having a respective bms card and sized so that their total energy that can be supplied is no more than 100 Wh, so as to respect the limits for the transport of lithium in an air cabin.

In the event that the presence of a bag is envisaged, this may have special pockets for containing and inspecting the batteries, as well as a special compartment with integrated charger and compartments for the cables.

Figure 10:
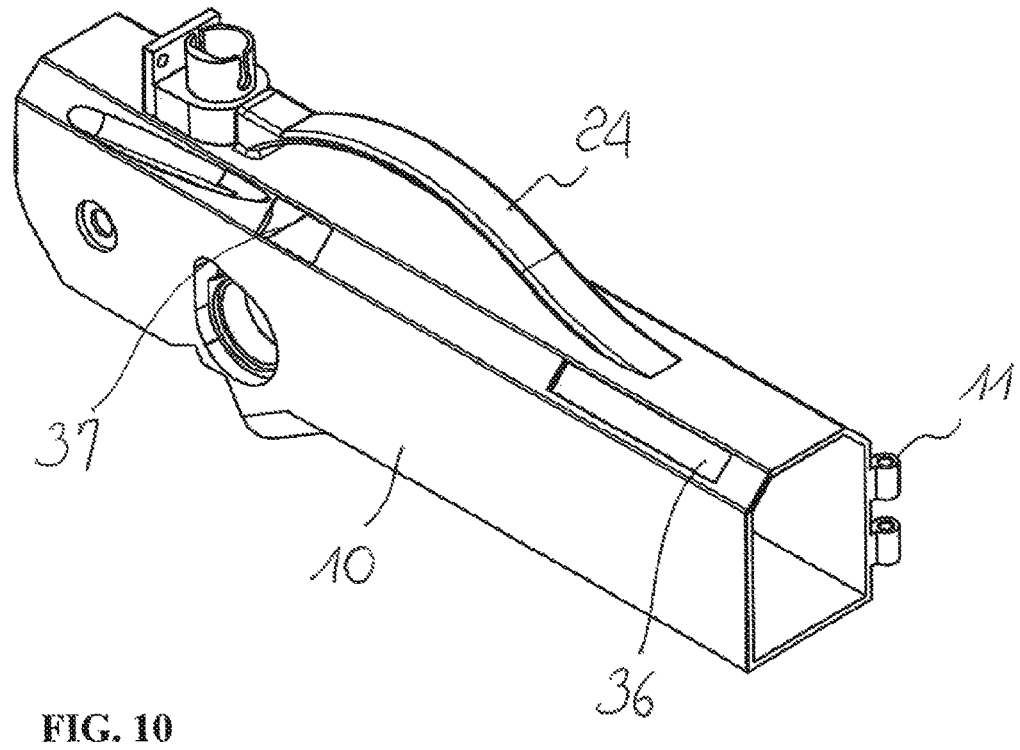
FIG. 10 is a perspective view of a portion of the supporting frame according to a further configuration.
Figure 11:
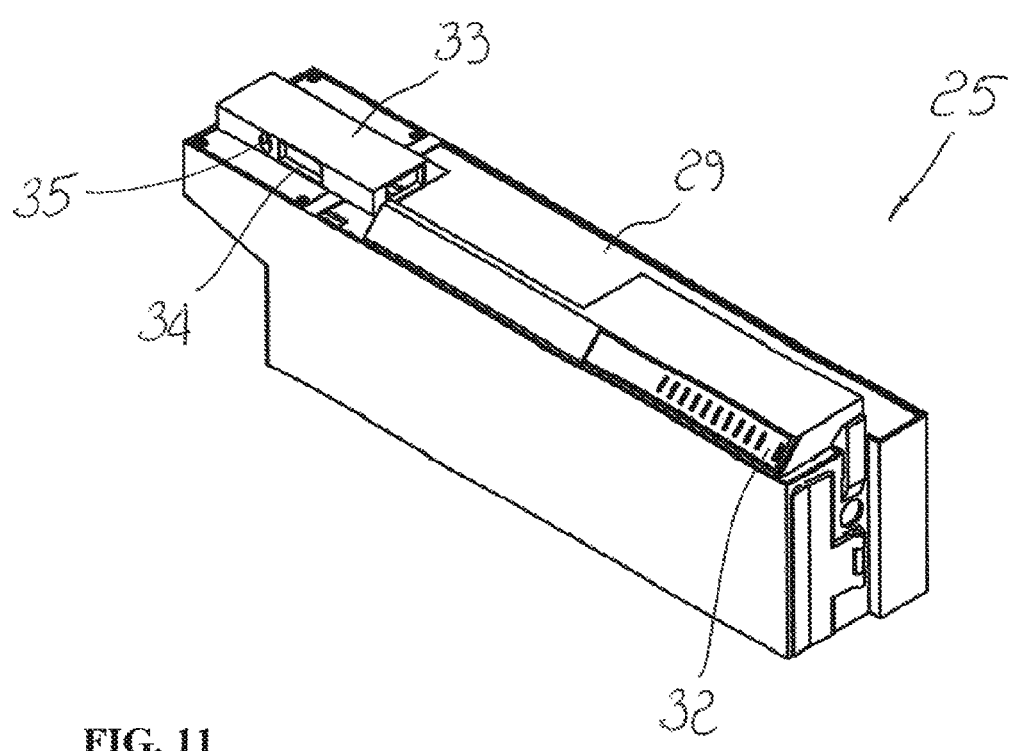
FIG. 11 is a perspective view of a further element which can be associated with the portion of the supporting frame of FIG. 10 and intended to house one or more batteries.

FIG. 10 shows a second preferred but not exclusive configuration of the rear portion 10 of the supporting frame 2 which differs from the previous one, as well as in the presence of a handle 24 suitable for facilitating gripping and transport of the frame 2 in the folded compact condition, due to the fact that it is configured to house a battery case 25 thereinside, illustrated more clearly in FIG. 11.

Figure 12:
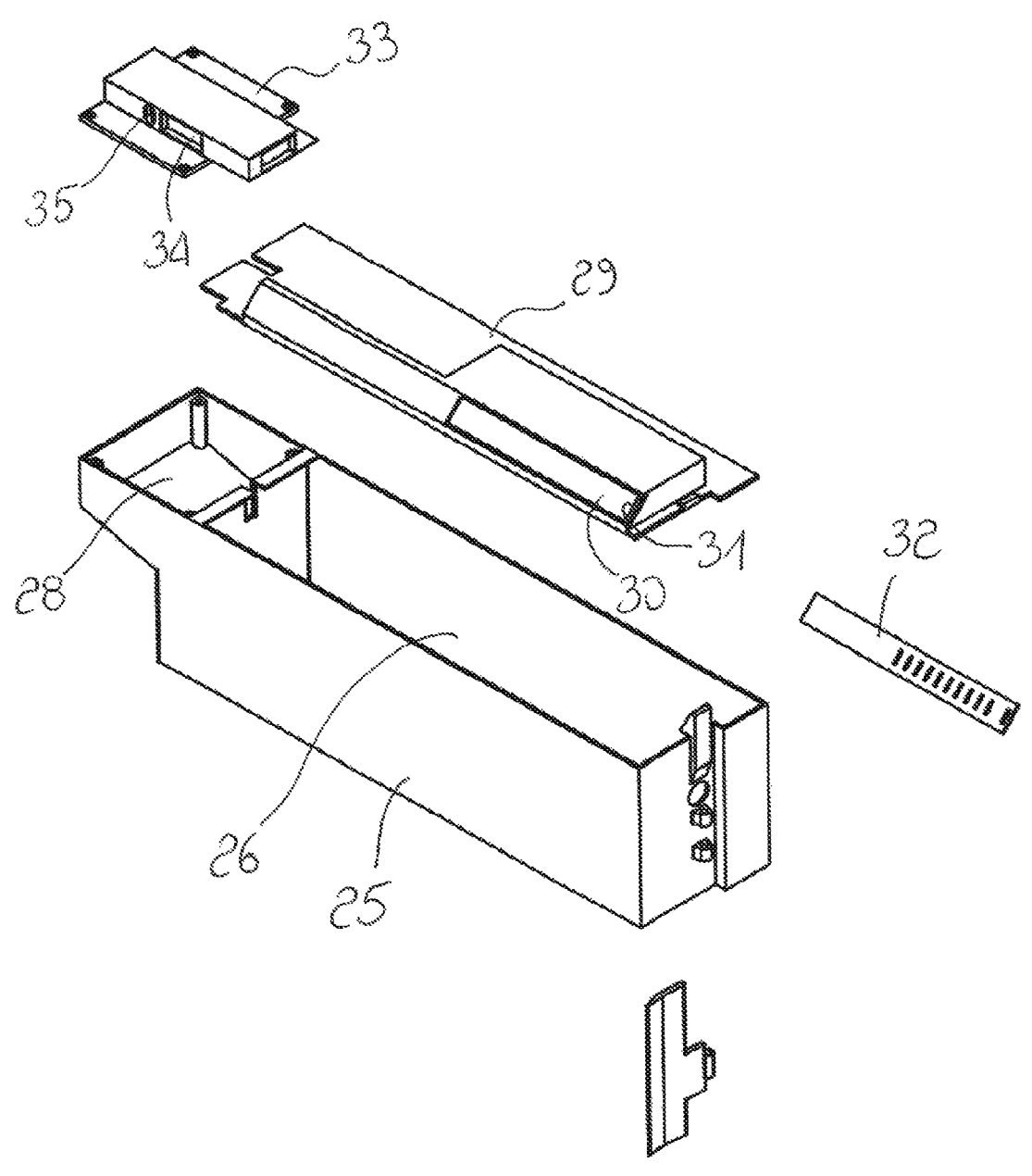
FIG. 12 is an exploded view of the element of FIG. 11.
Figure 13:
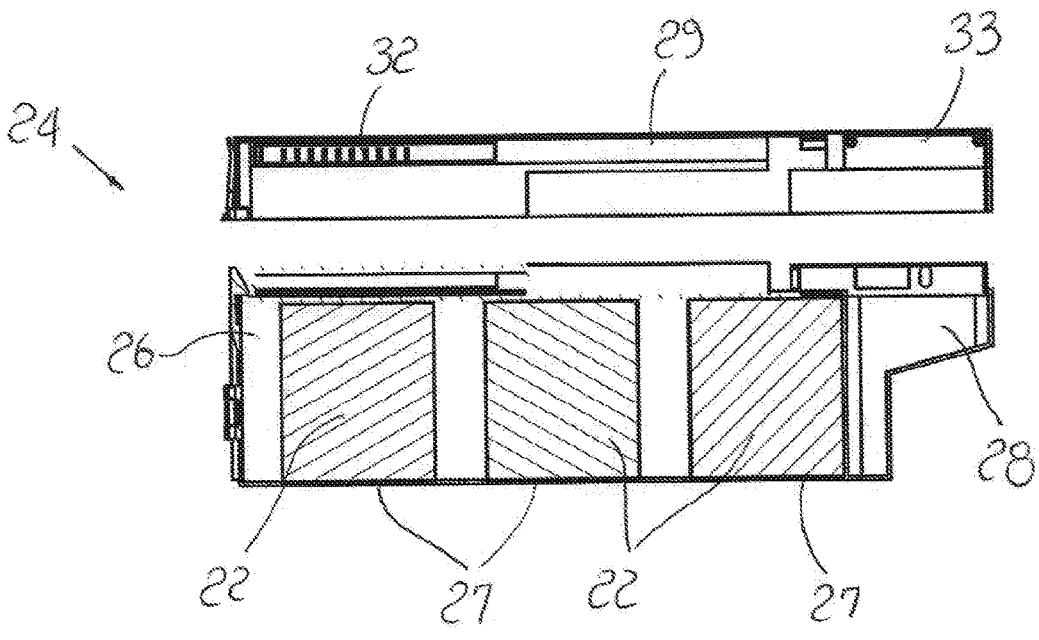
FIG. 13 is a sectional view of the element of FIG. 11.
Figure 14:
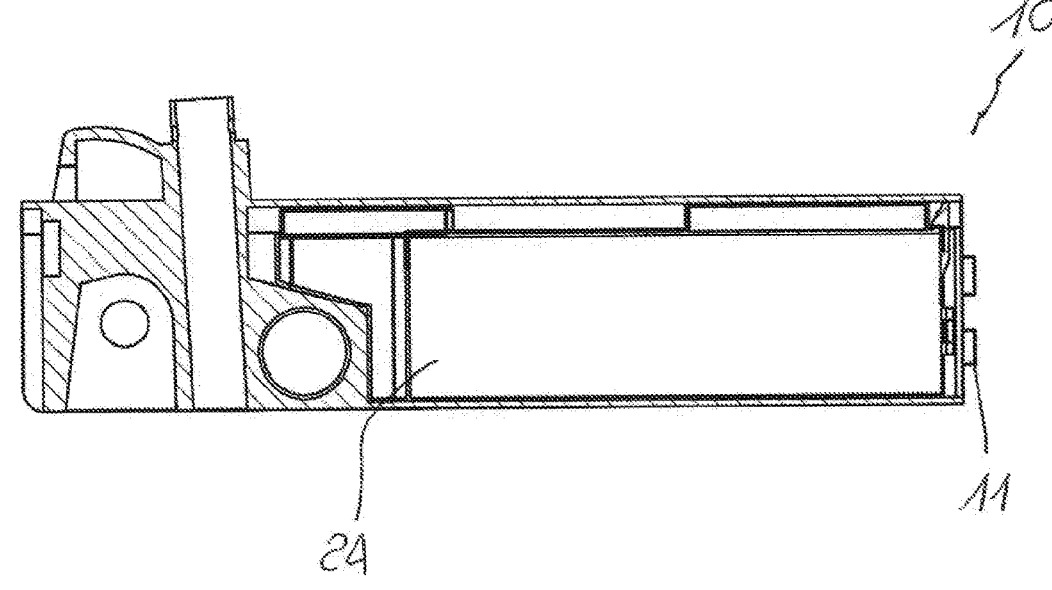
FIG. 14 is a sectional view of the portion of the frame of FIG. 10 housing the element of FIG. 11 thereinside.

According to a particularly advantageous aspect, as can also be seen from FIG. 12, the case 25 consists of a first battery compartment 26 provided with one or more housings, for example three housings 27 as illustrated in FIG. 13, for respective batteries, for example the aforementioned three lithium batteries 22.

The case 25 will also be provided with a second compartment 28 for housing a battery charger.

The first compartment 26 will be reclosable by means of a first removable lid 29 which can also be provided with a compartment 30 for the charging cable, which can be extracted through a special slot 31 accessible by removing a sliding cap 32.

The second compartment 28, on the other hand, will be reclosable by means of a second cover 33 which will also be provided with a hole 34 for the socket of the battery charger and with a peephole 35 for viewing the indicator lights indicating the charging of the battery charger, which can therefore be used without being it must be extracted from the second compartment 28.

The portion 10 of the frame 2 may be suitably configured with suitable slots 36, 37 designed to allow access to the compartment 30 for the charging cable and to the hole 34 for connection to the battery charger without having to remove the case 25 from inside it.

The structure 1 may also be implemented with further accessories, such as, in an exemplary and non-limiting manner, integrated speakers, integrated umbrella and/or umbrella holder, right and left turn indication devices, magnetic fixing system for the compact configuration.

The above foldable bicycle structure is susceptible of numerous modifications and variations. All the details can be replaced by other technically equivalent elements, and the materials can be different according to the needs, without leaving the scope of the invention.

The invention claimed is:

1. A foldable bicycle structure, comprising:
   a supporting frame (2) having a rear wheel (3) and a front wheel (4) and comprising:
   a handlebar (5) fastened to said frame (2);
   a seat post (6) having a lower end removably anchored to said supporting frame (2) and an upper end associated with a saddle (7);
   wherein said supporting frame (2) is divided into at least one front portion (9) and at least one rear portion (10) adapted to be connected to respective of said wheels (3, 4) and reciprocally hinged around a first hinge axis (11)

to move between an extended configuration of use to a compact configuration wherein said wheels (3, 4) are substantially side by side and parallel to each other, wherein said supporting frame (2) is provided with one or more straps (14, 15) each having one end fixed to said supporting frame (2) and a free end provided with a hook to allow the unwinding of the respective one of said straps (14, 15) and the hooking of the one of said straps (14, 15) to another part of the structure and be used as a shoulder strap for transporting the structure in a compact configuration and wherein at least one of said portions (9, 10) of said load-bearing frame (2) is hollow and said one or more straps (14, 15) are rolled up and housed in said at least one hollow portion (9, 10); wherein said one or more straps (14, 15) are extractable through a suitable slot (16) present in said at least one hollow portion (9, 10) to allow their unwinding and subsequent coupling of the respective free ends to another part of said structure.

2. The foldable bicycle structure as claimed in claim 1, having, in said compact configuration, a maximum overall dimensions of between 60×50×30 and 50×30×10 and preferably no more than 55×40×20 cm to be classified as hand luggage.

3. The foldable bicycle structure as claimed in claim 1, wherein said handlebar (5) comprises a stem (18) hinged to said front portion (9) of said supporting frame (2) to move from a raised position of use to a lowered position when said supporting frame (2) is in said compact configuration.

4. The foldable bicycle structure as claimed in claim 3, wherein said handlebar (5) comprises a tubular stem (18) having a telescopic structure to move from an extended position of use to a lowered and compact position when said supporting frame (2) is in said compact configuration.

5. The foldable bicycle structure as claimed in claim 1, wherein said seat post (6) is completely removable from said supporting frame (2) and said saddle (7) is removable from said seat post (6).

6. The foldable bicycle structure as claimed in claim 5, wherein one of said portions (9, 10) of said supporting frame (2) comprises a seat (17) for positioning and holding said seat post (6) in the removed condition and wherein said seat post (6) is adapted to be arranged substantially parallel to said portion (9, 10) of said supporting frame provided with said seat (17).

7. The foldable bicycle structure as claimed in claim 6, wherein said supporting frame (2) comprises means for coupling said saddle (7) to the hub (12) of one of said wheels (3, 4) and in a substantially position parallel to the plane of said wheels (3, 4).

8. The foldable bicycle structure as claimed in claim 7, wherein said saddle (7) is provided with an element for hooking said free end of said one or more straps (15).

9. The foldable bicycle structure as claimed in claim 1, comprising a central movement associated with an electric motor provided with battery-rechargeable power supply means.

10. The foldable bicycle structure as claimed in claim 9, wherein said power supply means comprise at least one pair of rechargeable batteries (22, 23) housed in respective hollow portions (9, 10) of said frame (2), at least one of said rechargeable batteries (22, 23) being removable.

11. The foldable bicycle structure as claimed in claim 9, wherein said power supply means comprise three lithium batteries separated from each other, said batteries having total energy that can be supplied lower than 100 Wh.

12. The foldable bicycle structure as claimed in claim 1, wherein said supporting frame (2) houses thereinside a case (25) provided with a first compartment (26) for housing one or more batteries and a second compartment (28) for a battery charger, said supporting frame (2) being provided with one or more slots (36) for accessing the battery charger with said case (25) inserted in said supporting frame (2).

\* \* \* \* \*